Patented Mar. 8, 1938

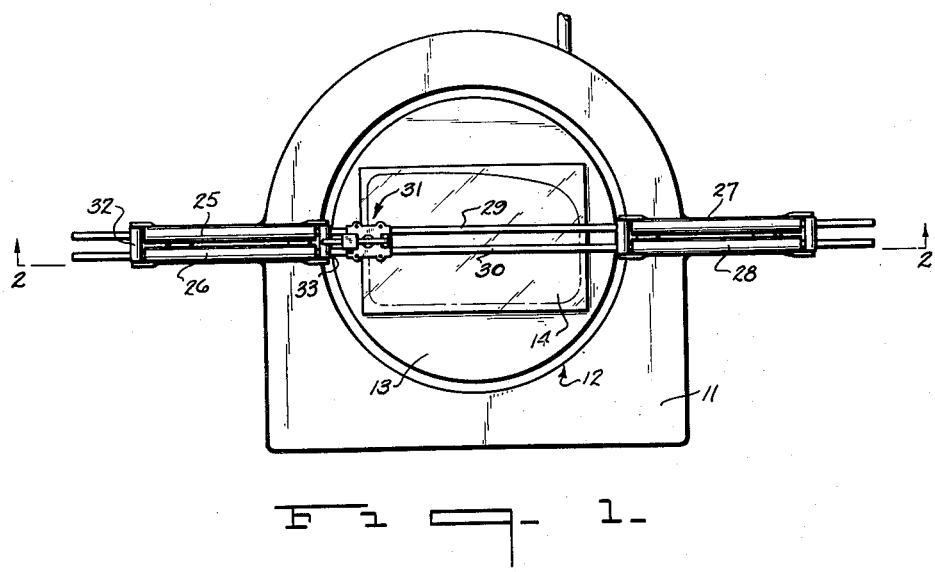
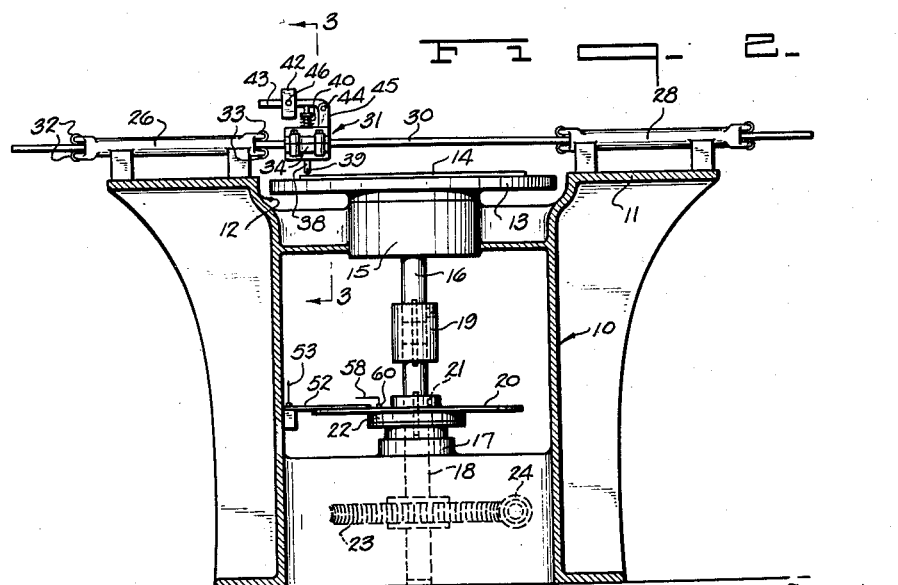

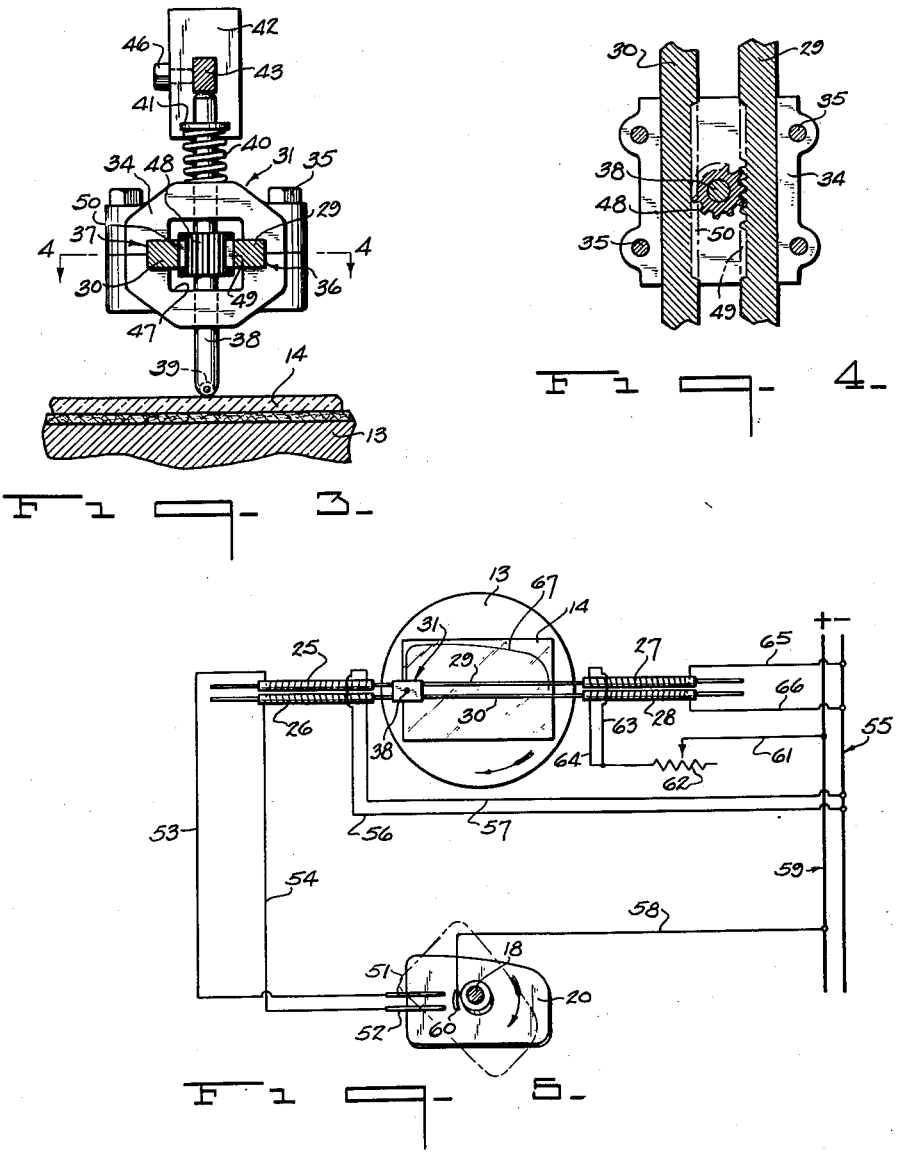

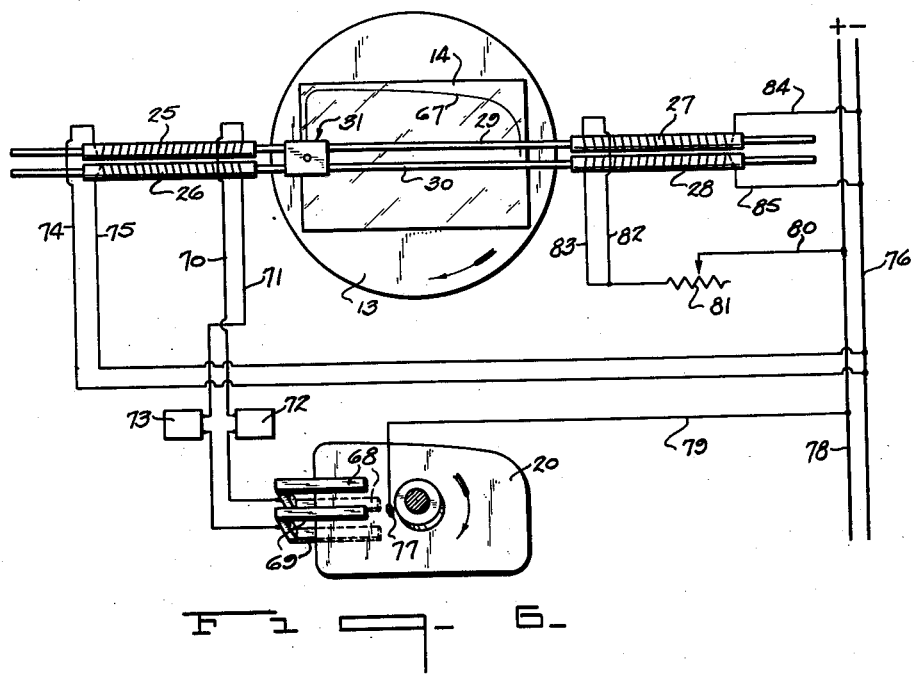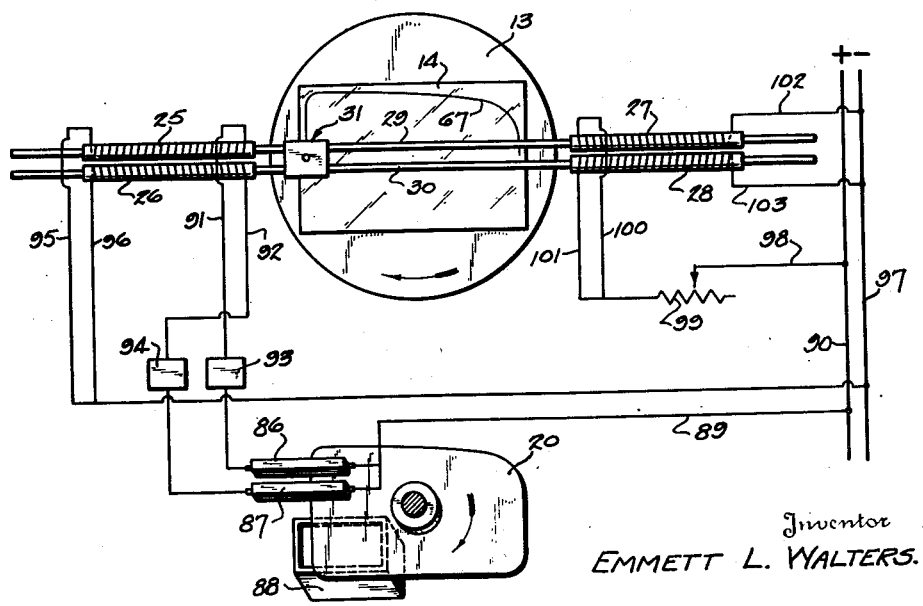

2,110,349

UNITED STATES PATENT OFFICE 2,110,349

CUTTING MACHINE

Emmett L. Walters, Toledo, Ohio, assignor to Libbey-Owens-Ford Glass Company, Toledo, Ohio, a corporation of Ohio Application April 10, 1936, Serial No. 73,697

8 Claims. (Cl. 33—27)

The present invention relates to improvements in cutting machines generally and more particularly to a machine designed primarily for the cutting of glass sheets or plates, although it is of course not restricted to such use.

An important object of the invention is to provide a cutting machine for cutting out from glass sheets or plates forms or sections of regular or irregular outline rapidly, accurately, and economically.

Another object of the invention is the provision of a cutting machine of the above character embodying a rotatable support for the sheet to be cut and a rotatable template of a predetermined shape and size, together with electrically operated means associated with the cutting tool and template for receiving electric current from the latter and responsive to any variation in the supply thereof, caused by rotation of the template, for actuating the cutting tool to cause the said tool to cut a faithful and accurate reproduction of the shape of the template.

A further object of the invention is the provision of a cutting machine of the above character wherein the template and cutting tool are electrically connected together in such a manner that during the cutting operation, the cutting edge of the cutting tool will be automatically maintained in a line tangent to that of the cut whereby the shape of the template will be accurately transferred to the cut sheet.

Other objects and advantages of the invention will become more apparent during the course of the following description when taken in connection with the accompanying drawings.

In the drawings wherein like numerals are employed to designate like parts throughout the same, Fig. 1 is a plan view of a cutting machine constructed in accordance with the present invention;

Fig. 2 is a vertical longitudinal sectional view therethrough taken substantially on line 2—2 of Fig. 1;

Fig. 3 is a vertical sectional view of the cutting unit taken substantially on line 3—3 of Fig. 2;

Fig. 4 is a horizontal sectional view taken substantially on line 4—4 of Fig. 3;

Fig. 5 is a diagrammatic view of the cutter actuating means and the electrical wiring therefor; and Figs. 6 and 7 are views similar to Fig. 5 but showing different types of electrical control means for the cutter.

With reference to the drawings and particularly to Figs. 1 to 5 inclusive, the cutting machine comprises a substantially cylindrical supporting base 10, the horizontal top 11 of which is provided with a circular opening 12 within which is arranged the circular table 13 upon which the glass sheet 14 to be cut is laid.

The table 13 is rotatably supported upon a bearing 15 carried centrally of the base 10 adjacent the upper end thereof and is fixed to the upper end of a vertical shaft 16 journaled in the said bearing 15.

Also carried by the base 10 directly beneath bearing 15 is a second bearing 17 within which is rotatably mounted a vertical shaft 18 disposed in alignment with the shaft 16 and connected therewith by a coupling 19. The adjacent ends of the shafts 16 and 18 are spaced from one another as shown in Fig. 2 and the coupling 19 is in the form of a sleeve slidably keyed thereto. Also slidably keyed upon the shaft 18 is the metal template or pattern plate 20 of the same shape and size as the glass sheet to be cut, said template being firmly clamped between the two relatively smaller discs 21 and 22 of suitable insulating material, with the disc 22 being supported upon the bearing 17. The shaft 18 is positively driven such as through a worm gear 23 and worm 24, the rotation of the shaft 18 being transmitted to shaft 16 by the coupling 19 whereby the template 20 and table 13 are driven in unison at the same speed.

Mounted upon the top 11 of the base 10 at diametrically opposite points are the two pairs of horizontally aligned solenoids 25—26 and 27—28 of any suitable construction. Extending through the aligned pair of solenoids 25—27 is a horizontal plunger 29 while a similar plunger 30 extends through the aligned pair of solenoids 26—28. The two plungers 29 and 30 are arranged parallel with one another and have mounted thereupon, adjacent the solenoids 25—26, the cutting unit 31. For the purpose of facilitating horizontal sliding movement of the plungers, upon energization of the solenoids, each pair of solenoids 25—26 and 27—28 is provided at its opposite ends with the pairs of vertically spaced transverse rollers 32 and 33 between which the said plungers are received.

The cutting unit 31 comprises a two part housing 34 constituting in effect a yoke which fits around the plungers 29 and 30, as best shown in Fig. 3. The two parts of the housing 34 are secured together by bolts or the like 35 and the said housing is provided with opposed horizontal slots 36 and 37 within which the plungers 29 and 30 are received. Carried by the cutter housing 34 is a vertical pin 38 provided at its lower end with the cutting tool 39 which preferably consists of a rotatable steel cutting wheel. The pin 38 is mounted for vertical movement within the housing and is normally urged upwardly, to hold the cutting wheel 39 out of cutting position, by a compression spring 40 bearing at its lower end against the top of the housing and at its upper end against a washer 41 carried by the said pin. In order to counteract the action of the spring 40 and maintain the cutting wheel in yieldable engagement with the glass, the pin 38 is forced downwardly by a weight 42 slidably carried upon a horizontal lever 43 pivoted at one end at 44 to a vertical extension 45 formed on the cutter housing 34. The lever 43 rests upon the top of the pin 38 and is urged downwardly by the weight 42 which is secured in the desired position by a set screw 46. The pressure of the cutting wheel 39 upon the glass sheet is determined by the position of the weight 42. When the lever 43 is swung upwardly out of engagement with the pin 38, the said pin will be moved upwardly by the compression spring 40 to lift the cutting wheel 39 off of the glass and maintain it in elevated position until the lever 43 is again lowered.

The cutter housing 34 is provided with a central opening 47 through which the pin 38 passes, and keyed to the said pin within said opening is a gear 48 meshing with vertical rack teeth 49 and 50 formed upon the inner adjacent faces of the plungers 29 and 30. The rack teeth do not extend throughout the length of the plungers, but only for a relatively short distance as shown in Fig. 4. This construction is provided so as to effect the desired rotation or turning of the pin 38 carrying the cutting wheel 39 upon relative longitudinal movement of the plungers 29 and 30 whereby to maintain the said cutting wheel always in a line tangent to the line of cut.

In accordance with the invention, an electrical control means is provided for the cutting unit 31 and operable upon rotation of the template 20 to the end that the cutting wheel 39 will be caused to follow a path corresponding to the contour of the template so as to cut from the the glass sheet 14 a form or section of the same shape and size as the said template. In order to effect accurate cutting of the glass sheet in this manner, it is very important that the cutting wheel be always maintained in a line tangent to that of the cut especially when there is a sudden change in the contour of the template. The electrical control means herein provided for the cutting unit not only causes horizontal bodily movement of the said unit upon rotation of the template, but also simultaneously effects the desired rotation or turning of the pin 38 to maintain the cutting wheel tangent to the line of cut.

Three different forms of cutter control means are illustrated in Figs. 5, 6, and 7. With reference first to Fig. 5, the template 20 is adapted to serve as a conductor for electrical energy and to supply the energy in varying amounts, upon the rotation thereof, to the solenoids 25 and 26 which actuate the plungers 29 and 30 to impart the desired movement to the cutting wheel. To accomplish this purpose, there are associated with the template 20 the two resistances 51 and 52 arranged parallel with one another approximately one-quarter of an inch apart and extending radially of the template in contact with the upper surface thereof. The resistances 51 and 52 are connected by the wires 53 and 54 to the solenoids 25 and 26 respectively, while leading from the solenoids 25 and 26 are wires 56 and 57 attached to the negative main line 55. The electric current is introduced into the template through a wire 58 leading from the positive main line 59 and connected to a brush 60 resting upon the template. The current entering the template is adapted to pass therefrom through the resistances 51 and 52 and wires 53 and 54 to the solenoids 25 and 26 respectively, and thence outwardly to the negative main line 55 through wires 56 and 57.

In order to balance the operation of the solenoids 25 and 26, a constant supply of current is adapted to continuously flow through the solenoids 27 and 28. This current, entering through the main positive line 59, passes through the wire 61, variable resistance 62, and wires 63 and 64 to the solenoids 27 and 28 respectively and thence outwardly through wires 65 and 66 to the negative main line 55.

In operation, the solenoids 27 and 28 are adapted to exert a predetermined constant pull upon the plungers 29 and 30 tending to move the cutting unit to the right in Fig. 5, with the amount of pull being controlled by the variable resistance 62. Simultaneously, the amount of current being supplied to the solenoids 25 and 26 is varying due to the rotation of the template 20 and the opposition offered by the resistances 51 and 52 to the passage of current therethrough. In other words, as the template rotates, thereby contacting with a a larger or smaller portion of the length of the resistances, the opposition of the resistances to the passage of the current will vary. When the resistances show a differential in the amount of current passing therethrough to the solenoids 25 and 26, the same differential is transferred through longitudinal movement of the plungers 29 and 30 to the cutting wheel 39. That is to say, the movement of the cutting wheel is controlled by variable resistance, with the resistance being varied by rotation of the template.

More specifically, if the amount of current supplied to the solenoids 25 and 26 is the same (as would be the case with the template 20 in the full line position in Fig. 5) and this amount of current is greater than that supplied to the solenoids 27 and 28, both plungers 29 and 30 would be drawn equal distances to the left, causing bodily movement of the cutting unit 31 in this direction. On the other hand, assuming that the amount of current supplied to the solenoids 25 and 26 is greater than that supplied to solenoids 27 and 28 and, further, that the amount of current varies as between the two solenoids 25 and 26 (as would be the case with the template in the broken line position), it will be apparent that relative longitudinal movement between the plungers 29 and 30 would result so that the cutting unit would not only be moved bodily to the left but also the cutting wheel would be rotated due to the engagement of the rack teeth 49 and 50 with the gear 48 keyed to vertical cutter pin 38. When the supply of current to the solenoids 25 and 26 is less than that supplied to solenoids 27 and 28, the said solenoids 27 and 28 will act to draw the plungers and cutting unit carried thereby to the right. It will thus be seen that movement of the cutting wheel 39 is controlled both as to bodily as well as rotary movement by the differential between the resistances 51 and 52 caused by rotation of the template, and that this same differential is transferred through motion of the plungers 29 and 30 to the cutting wheel 39 whereby the tangency of the said wheel to the radii on the template is maintained at all times.

In Fig. 6 the electrical control of the cuttter is effected by a condenser which consists of the two pairs of horizontal conducting plates 68—68 and 69—69 disposed at opposite sides of the template 20 which constitutes the di-electric. The condenser plates 68 and 69 are connected to the solenoids 25 and 26 by wires 70 and 71 respectively in which are interposed the amplifiers 72 and 73, of any well known construction, for amplifying the current flowing through the conducting plates 68 and 69. Leading from the solenoids 25 and 26 are wires 74 and 75 running to the negative main line 76. The electric current is introduced into the template through a brush 77 connected to the positive main line 78 by a wire 79. A constant supply of current is supplied to the solenoids 27 and 28 through the wire 80 leading from the main positive line 78, variable resistance 81, and wires 82 and 83 respectively, said current passing from the solenoids to the negative main line 76 through wires 84 and 85. The control and operation of the cutting wheel is the same in this case as in Fig. 5, the only difference being that instead of using resistances to vary the amount of current passing from the template to the solenoids 25 and 26, the passage of the current is controlled by a condenser.

In Fig. 7 the cutter is controlled by photo-electricity and the apparatus includes the two photo-electric cells 86 and 87 disposed horizontally above the template 20 while positioned beneath the said template is a source of light 88. As is well known, a photo-electric cell generates an electric current when subjected to light and the amount of electric current generated is varied upon rotation of the template to expose a greater or smaller portion of the length of the photo-electric cells to the source of light. In other words, the amount of light which is allowed to fall upon the cells 86 and 87 determines the movement of the plungers 29 and 30 in the solenoids and as the template and sheet revolve, the cut is made. The photo-electric cells 86 and 87 are connected by a wire 89 to the positive main line 90 and to the solenoids 25 and 26 by wires 91 and 92 respectively in which are interposed the current amplifiers 93 and 94. Leading from the solenoids are wires 95 and 96 connected to the negative main line 97. In this case a constant predetermined amount of current is also supplied to the solenoids 27 and 28, the current passing from the positive main line 90 through the wire 98, variable resistance 99, and wires 100 and 101 to the solenoids and thence from the solenoids through wires 102 and 103 to the negative main line 97.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet cutting apparatus, a rotatable support for the sheet to be cut, a rotatable template, a cutting unit mounted above the support for horizontal bodily movement and including a rotatable cutting tool, means for supplying electric current to said template, and an electrical control means operatively connecting the cutting unit and template and deriving current from the latter to effect both bodily horizontal movement of the cutting unit and also rotation of the cutting tool upon rotation of said template, the amount of current supplied to the electrical control means being variable with the contour of the template to cause said electrical control means to actuate said tool in a manner to cause it to follow a path corresponding to the contour of the template so as to cut from the sheet a form of the same shape and size as the said template.

2. In sheet cutting apparatus, a rotatable support for the sheet to be cut, a rotatable template, a cutting unit mounted above the support and including a cutting tool, means for supplying electric current to said template, and electrically operated means operatively connecting the cutting unit and template for receiving current from the latter and responsive to any variation in the supply of current, caused by rotation of the template, for causing the cutting tool to follow a path corresponding to the contour of the template so as to cut from the sheet a form of the same shape and size as the said template, the amount of current supplied to the electrically operated means being variable with the contour of the template.

3. In sheet cutting apparatus, a rotatable support for the sheet to be cut, a rotatable template, a pair of spaced parallel plungers extending horizontally above said support, a cutting unit carried by said plungers and including a rotatable cutting tool, electrically operated means for applying a constant pull upon the plungers in one direction, means for supplying electric current to the template, electrically operated means for receiving current from the template and responsive to any variation in the supply of current, caused by rotation of the template, for applying a variable pull upon the plungers in the opposite direction, the amount of current supplied to the electrically operated means being variable with the contour of the template, and operative connections between the plungers and cutting tool for maintaining the cutting edge of said tool tangent to the line of cut upon relative longitudinal movement between said plungers.

4. In sheet cutting apparatus, a rotatable support for the sheet to be cut, a rotatable template, horizontally aligned pairs of solenoids arranged at opposite sides of said support, a pair of spaced parallel plungers extending horizontally through opposed solenoids, a cutting unit carried by the plungers and including a rotatable cutting tool, means for supplying a constant amount of current to the pair of solenoids at one side of said support, means associated with the template and support operatively connected with the pair of solenoids at the opposite side of said support for supplying a variable amount of current thereto to effect relative longitudinal movement between said plungers, the amount of current supplied to said last-named solenoids being variable with the contour of the template, and means for causing rotation of the cutting tool upon relative longitudinal movement between said plungers to maintain the cutting edge of said tool tangent to the line of cut.

5. In sheet cutting apparatus, a rotatable support for the sheet to be cut, a rotatable template, horizontally aligned pairs of solenoids arranged at opposite sides of said support, a pair of spaced parallel plungers extending horizontally through opposed solenoids, a cutting unit carried by the plungers and including a rotatable cutting tool, means for supplying a constant amount of current to the pair of solenoids at one side of said support, means for supplying electric current to the template, means associated with the template for receiving current therefrom and supplying it to the pair of solenoids at the opposite side of said support, said solenoids being responsive to any variation in the supply of current delivered thereto and adapted to impart this movement to the plungers to effect relative longitudinal movement thereof, the amount of current supplied to the last-named solenoids being variable with the contour of said template, and operative connections between the plungers and cutting tool for maintaining the cutting edge of said tool tangent to the line of cut upon relative longitudinal movement between said plungers.

6. In sheet cutting apparatus, a rotatable support for the sheet to be cut, a rotatable template, horizontally aligned pairs of solenoids arranged at opposite sides of said support, a pair of spaced parallel plungers extending horizontally through opposed solenoids, a cutting unit carried by the plungers and including a rotatable cutting tool, means for supplying a constant amount of current to the pair of solenoids at one side of said support, means for supplying electric current to the template, a pair of resistances associated with the template and connected with the pair of solenoids at the opposite side of said support, the amount of current supplied to the last-mentioned pair of solenoids varying upon rotation of the template and the opposition offered by the resistances, and means for causing rotation of the cutting tool upon relative longitudinal movement between said plungers to maintain the cutting edge of said tool tangent to the line of cut.

7. In sheet cutting apparatus, a rotatable support for the sheet to be cut, a rotatable template, horizontally aligned pairs of solenoids arranged at opposite sides of said support, a pair of spaced parallel plungers extending horizontally through opposed solenoids, a cutting unit carried by the plungers and including a rotatable cutting tool, means for supplying a constant amount of current to the pair of solenoids at one side of said support, means for supplying electric current to the template, pairs of conducting plates disposed at opposite sides of the template and forming with said template a condenser, said plates being connected with the pair of solenoids at the opposite side of said support, the supply of current passing through the condenser plates to the last-mentioned pair of solenoids being varied and controlled by rotation of the template to the end that the same differential in the amount of current passing to said solenoids will be transferred to said plungers, and means for causing rotation of the cutting tool upon relative longitudinal movement of said plungers to maintain the cutting edge of said tool tangent to the line of cut.

8. In sheet cutting apparatus, a rotatable support for the sheet to be cut, a rotatable template, horizontally aligned pairs of solenoids arranged at opposite sides of said support, a pair of spaced parallel plungers extending horizontally through opposed solenoids, a cutting unit carried by the plungers and including a rotatable cutting tool, means for supplying a constant amount of current to the pair of solenoids at one side of said support, a pair of photo-electric cells arranged in parallel at one side of the template and electrically connected to the pair of solenoids at the opposite side of said support, a source of light disposed at the opposite side of said template, the amount of electric current generated by the photo-electric cells being varied, upon rotation of the template, to control the amount of light which is allowed to fall upon said cells, thereby varying the amount of current supplied to the last-mentioned pair of solenoids to effect the desired longitudinal movement of the plungers, and means for causing rotation of the cutting tool, upon relative longitudinal movement of the plungers, to maintain the cutting edge of said tool tangent to the line of cut.

EMMETT L. WALTERS.